United States Patent

[11] 3,607,949

| [72] | Inventor | Thomas F. Cleary<br>Summit, N.J. |
|---|---|---|
| [21] | Appl. No. | 798,146 |
| [22] | Filed | Feb. 10, 1969 |
| [45] | Patented | Sept. 21, 1971 |
| [73] | Assignee | Centerchem, Inc.<br>New York, N.Y. |

[54] PRODUCTION OF 2,2'-METHYLENEBIS (3,4,6-TRICHLOROPHENOL)
4 Claims, No Drawings

[52] U.S. Cl. ............................................ 260/619
[51] Int. Cl. ............................................ C07c 39/16
[50] Field of Search ............................................ 260/619 A

[56] References Cited
UNITED STATES PATENTS

| 2,730,554 | 1/1956 | Schetty et al. | 260/619 A |
| 2,812,365 | 11/1957 | Gump et al. | 260/619 A |
| 2,435,593 | 2/1948 | Luthy et al. | 260/619 A |
| 3,072,677 | 1/1963 | Lei | 260/619 A |
| 3,408,408 | 10/1968 | Drew et al. | 260/619 A |
| 3,456,020 | 7/1969 | Cleary | 260/619 A |

*Primary Examiner*—Bernard Helfin
*Attorneys*—Charles E. Baxley and Thomas E. Tate

ABSTRACT: This invention is directed to the production of 2,2'-methylenebis (3, 4, 6-trichlorophenol), commonly known as hexachlorophene, by reacting 1 mol of 2, 4, 5-trichlorophenol, 1 mol of 2, 4, 5-trichlorophenylsulfate and 1 mol of formaldehyde in a solvent solution in which the 2, 4, 5-trichlorophenylsulfate has been prepared in situ by reacting 2, 4, 5-trichlorophenol with sulfurtrioxide.

PRODUCTION OF 2,2'-METHYLENEBIS (3,4,6-TRICHLOROPHENOL)

THE INVENTION

This invention relates generally to new and useful improvements in the production of 2,2'-methylene bis (3, 4, 6-trichlorophenol), commonly called hexachlorophene, and particularly seeks to provide a novel process for producing same in a rapid manner.

Publicly known processes for the preparation of hexachlorophene, 2,2'-methylene bis (3, 4, 6-trichlorophenol), involve the condensation of 2 mols of 2, 4, 5-trichlorophenol with 1 mol of formaldehyde (as formalin or paraformaldehyde). The usual condensing agent is concentrated sulfuric acid or weak oleum, and the reaction may be carried out in the presence or absence of a solvent which is inert to the reactants and to the condensing agent.

In such processes it is customary to mix all of the reactants (and the solvent, if any) at once and to heat the mixture, with agitation, for a certain time. Conditions such as these are disadvantageous in the production of hexachlorophene in that:

1. They tend to promote the formation of color bodies which made difficult the purification of the product;
2. They tend to promote the formation of the byproduct 2, 4, 5-trichlorobenzodioxolane with an attendant loss of yield;
3. They require, if acceptable yields are to be obtained, extreme care that the 2, 4, 5-trichlorophenol and formaldehyde be present in exactly the molar ratio of 2.00:1.00. Since the composition of formalin or of formaldehyde is usually imprecise, and since a certain amount of formaldehyde is lost from the reaction mixture by volatilization, this is a difficult requirement to realize in practice.

However, through the use of this invention the above mentioned disadvantages in prior processes have been overcome.

Therefore, an object of this invention is to provide a novel method of producing hexachlorophene by reacting 1 mol of 2, 4, 5-trichlorophenol, 1 mol of 2, 4, 5-trichlorophenylsulfate and 1 mol of formaldehyde in a solvent.

Another object of this invention is to provide a method of the character stated in which the 2, 4, 5-trichlorophenylsulfate is formed in situ in the solvent by reacting 2, 4, 5-trichlorophenol with sulfurtrioxide.

Another object of this invention is to provide a method of the character stated in which the three reactants form a homogenous solution in the reaction solvent which permits the formation of hexachlorophene to take place very rapidly and in which the relatively small amount of sulfuric acid formed in the reaction occurs in a form that is readily separated from the reaction mixture.

With these and other objects, the nature of which will be apparent, the invention will be more fully understood by reference to the accompanying detailed description and the appended claims.

In accordance with this invention it has been discovered that hexachlorophene can be produced in a novel manner by reacting 1 mol of 2, 4, 5-trichlorophenol, 1 mol of 2, 4, 5-trichlorophenylsulfate and 1 mol of formaldehyde (as paraformaldehyde) in a solvent in which the 2, 4, 5-trichlorophenylsulfate has been prepared in situ by reacting 2, 4, 5-trichlorophenol with sulfurtrioxide.

The solvent may be methylene chloride, ethylene chloride, chloroform, perchloroethylene, ethyl ether, propyl ether or butyl ether. The sulfurtrioxide may be used as such in its stabilized industrial form, available commercially, for example, under the trademark "Sulfan," or it may be introduced in the form of oleum of any commercially available strength containing from about 20 percent to about 60 percent sulfurtrioxide.

The formation of hexachlorophene by the process of this invention is indicated by the following equations:

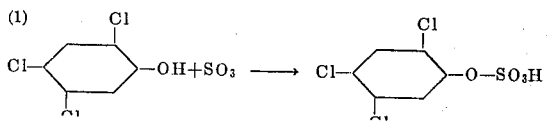

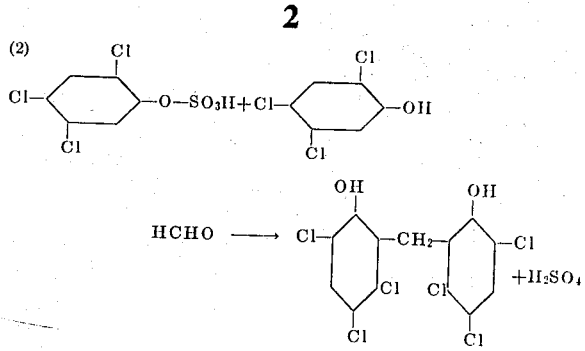

The following examples are illustrative of the process of this invention:

EXAMPLE 1

197.5 grams of 2, 4, 5-trichlorophenol, having a melting point of 65° C., is dissolved in 1,000 ml. of chloroform and with agitation 80 grams of commercially available stabilized sulfur trioxide, "Sulfan," are added dropwise, and sufficient cooling is supplied to remove the heat of reaction so that the temperature does not exceed 50° C. To the resulting clear chloroform solution of 2, 4, 5-trichlorophenylsulfate is added a solution of 197.5 grams of 2, 4, 5-trichlorophenol, having a melting point of 65° C., in 600 ml. of chloroform, and while the solution is maintained at 50° C. with agitation, 31.6 grams of paraformaldehyde is added in portions over 15 minutes. Immediately upon the addition of the paraformaldehyde, sulfuric acid begins to separate in droplets from the reaction mixture which is then heated with agitation to reflux for 1 hour. The reaction mixture is then allowed to stand for 15 minutes without agitation, and the chloroform solution is decanted from the residual sulfuric acid, stirred with 5 grams of activated charcoal, filtered while hot, and evaporated to dryness to yield 382 grams of hexachlorophene, having a melting point of 161° C.

EXAMPLE 2

197.5 grams of 2, 4, 5-trichlorophenol, having a melting point of 65° C., is dissolved in 1,000 ml. of perchloroethylene and with agitation 267 grams of oleum containing 30 percent of free sulfurtrioxide is added. The heat of reaction between the sulfurtrioxide and 2, 4, 5-trichlorophenol to form 2, 4, 5-trichlorophenylsulfate causes the temperature to rise to 60° C. Agitation is continued for 15 minutes and then stopped, whereupon a layer of sulfuric acid forms at the bottom. The sulfuric acid layer is separated and is found to weigh 185 grams which is approximately the difference between the 267 grams of 30 percent oleum which was added and the 80 grams of sulfurtrioxide contained in that amount of oleum and consumed in the formation of 2, 4, 5-trichlorophenylsulfate. To the remaining clear perchloroethylene solution of 2, 4, 5-trichlorophenylsulfate is added a solution of 197.5 grams of 2, 4, 5-trichlorophenol, having a melting point of 65° C., in 600 ml. of perchloroethylene. The resulting solution is heated to 60° C., and 31.6 grams of 95 percent paraformaldehyde is added over 10 minutes, whereupon droplets of sulfuric acid begin to separate from the reaction mixture. The mixture is then heated with agitation to 80° C. for 1 hour. Agitation is discontinued and after settling for 10 minutes, the perchloroethylene solution of the reaction product is decanted, stirred with 5 grams of activated charcoal, filtered, and cooled to 0° C. the resulting crystalline product is filtered off and dried to yield 335 grams of pure white hexachlorophene, having a melting point of 165° C.

EXAMPLE 3

197.5 grams of 2, 4, 5-trichlorophenol, having a melting point of 65° C., is dissolved in 1,000 ml. of ethylenedichloride and with agitation 133 grams of oleum containing 60 percent of free sulfurtrioxide is added. The heat of reaction between the sulfurtrioxide and 2, 4, 5-trichlorophenol to form 2, 4, 5-

Agitation is continued for 15 minutes and then stopped, whereupon a layer of sulfuric acid forms at the bottom. The sulfuric acid layer is separated and is found to weigh 51 grams which is approximately the difference between the 133 grams of 60 percent oleum which was added and the 80 grams of sulfurtrioxide contained in that amount of oleum and consumed in the formation of 2, 4, 5-trichlorophenylsulfate. To the remaining clear ethylenedichloride solution of 2, 4, 5-trichlorophenylsulfate is added a solution of 197.5 grams of 2, 4, 5-trichlorophenol, having a melting point of 65° C., in 600 ml. of ethylenedichloride. The resulting solution is heated to 55° C., and 31.6 grams of 95 percent paraformaldehyde is added over 10 minutes, whereupon droplets of sulfuric acid begins to separate from the reaction mixture. The mixture is then heated with agitation of 75° C. for 1 hour. Agitation is discontinued and after settling for 10 minutes, the ethylenedichloride solution of the reaction product is decanted, stirred with 5 grams of activated charcoal, filtered, and cooled to 5° C. The resulting crystalline product is filtered off and dried to yield 320 grams of pure white hexachlorophene, having a melting point of 164° C.

I claim:

1. In a method of preparing hexachlorophene the steps of; preparing 1 mol of 2, 4, 5-trichlorophenylsulfate by reacting, in a solvent solution, 1 mol of 2, 4, 5-trichlorophenol with sulfurtrioxide; then reacting said 1 mol of 2, 4, 5-trichlorophenylsulfate with another mol of 2, 4, 5-trichlorophenol and 1 mol of formaldehyde in said solvent solution; and recovering hexachlorophene from the solvent solution remaining after completion of the preceding reaction.

2. The method of claim 1 in which the solvent for said solvent solution is selected from the group consisting of methylene, chloride, ethylene chloride, chloroform, perchloroethylene, ethyl ether, propyl ether, and butyl ether.

3. The method of claim 2 in which said hexachlorophene is recovered from said remaining solvent solution by adding activated charcoal thereto, then filtering same, and then evaporating the filtered solution to dryness.

4. The method of claim 2 in which the sulfuric acid formed as the result of said second reaction is separated from said remaining solvent solution prior to the recovery of hexachlorophene therefrom.